United States Patent [19] [11] 4,186,177
Shiga et al. [45] Jan. 29, 1980

[54] METHOD FOR CATALYTICALLY REDUCING NITROGEN OXIDES USING MOVING CATALYST BED REACTOR

[75] Inventors: Shujiro Shiga, Chiba; Takeshi Katsumata, Ichihara; Yasushi Okamoto, Ichihara; Tadashi Higasa, Ichihara, all of Japan

[73] Assignee: Sumitomo Chemical Company, Limited, Osaka, Japan

[21] Appl. No.: 816,806

[22] Filed: Jul. 18, 1977

[30] Foreign Application Priority Data

Jul. 20, 1976 [JP] Japan .................................. 51-87005

[51] Int. Cl.$^2$ ............................................. B01D 53/34
[52] U.S. Cl. .................................................... 423/239
[58] Field of Search ................. 423/239; 252/411; 23/288 G; 422/178

[56] References Cited

U.S. PATENT DOCUMENTS

| 2,378,394 | 6/1945 | Degnen et al. | 23/288 G |
| 2,459,425 | 1/1949 | Hemminger | 23/288 G |
| 3,578,608 | 5/1971 | Aykan | 252/411 |
| 4,044,102 | 8/1977 | Muraki et al. | 423/239 |

FOREIGN PATENT DOCUMENTS 2411888  9/1974  Fed. Rep. of Germany.

*Primary Examiner*—G. O. Peters
*Attorney, Agent, or Firm*—Birch, Stewart, Kolasch & Birch

[57] ABSTRACT

A method for the removal of nitrogen oxides from heavy oil combustion exhaust gases containing nitrogen oxides, sulfur oxides and dusts by a catalytic reduction process using a moving catalyst bed reactor wherein the exhaust gases are catalytically contacted with ammonia at 250° to 450° C., which is characterized in that a sealing gas having a temperature of 200° C. or higher, preferably 280° C. or higher, and a pressure higher than the average pressure at the outlet and inlet of the moving catalyst bed reactor is introduced into the portions of the reactor where the catalyst is taken out therefrom and is again supplied thereto, whereby the decrease of the catalyst activity can be effectively prevented.

5 Claims, No Drawings though this method, although the decrease of the catalyst activity due to poison by sulfur oxides may be prevented, the catalyst activity is still unfavorably decreased in case of a moving bed system. Besides, even if the catalyst poisoned by sulfur oxides is reactivated, the original activity of the catalyst can not sufficiently be recovered by such a reactivation treatment.

METHOD FOR CATALYTICALLY REDUCING NITROGEN OXIDES USING MOVING CATALYST BED REACTOR

BACKGROUND OF THE INVENTION

The present invention relates to a method for catalytically reducing nitrogen oxides in exhaust gases containing nitrogen oxides, sulfur oxides and dusts which are produced by burning a heavy oil. More particularly, it relates to a method for the removal of nitrogen oxides from exhaust gases by a catalytic reduction process wherein a sealing gas is introduced into the portions of the moving catalyst bed reactor where the catalyst is taken out therefrom and is again supplied thereto, whereby the precipitation and adhesion of salts such as ammonium sulfate and ammonium hydrogen sulfate onto the catalyst are effectively prevented.

There have, recently, been developed various methods for the removal of nitrogen oxides from heavy oil combustion exhaust gases by catalytically reducing nitrogen oxides in the presence of ammonia.

It is known that a process for the removal of nitrogen oxides using a fixed bed type reduction reactor has various problems, for instance, it is very difficult to remove completely the dusts from a large amount of combustion exhaust gases and the dusts are built up onto the catalyst bed which results in increase of the pressure loss. Even if the dusts can be completely removed, it requires a high cost. Besides, the catalyst is poisoned by sulfur oxides and the activity of the catalyst is markedly decreased.

For the purpose of eliminating these defects, a moving catalyst bed has been proposed. That is, a part of the catalyst is taken out from the reactor, and the dusts accompanied with the catalyst are removed and optionally the catalyst is reactivated and then the catalyst thus treated is again supplied into the reactor.

However, according to this method, although the decrease of the catalyst activity due to poison by sulfur oxides may be prevented, the catalyst activity is still unfavorably decreased in case of a moving bed system. Besides, even if the catalyst poisoned by sulfur oxides is reactivated, the original activity of the catalyst can not sufficiently be recovered by such a reactivation treatment.

As the result of extensive studies by the present inventors, there have been found the causes of the decrease of catalyst activity and the method for preventing the decrease of catalyst activity. That is, it has now been found that in the process for catalytically reducing nitrogen oxides in the exhaust gases containing nitrogen oxides, sulfur oxides and dusts which is produced by burning a heavy oil using a moving catalyst bed reactor wherein the exhaust gases are contacted with ammonia in the presence of a catalyst of metal oxides (e.g. a catalyst produced by carrying oxides of vanadium, tungsten, molybdenum or the like onto a carrier such as alumina), the decrease of catalyst activity is induced by the adhesion of salts such as ammonium sulfate or ammonium hydrogen sulfate onto the catalyst at the portions of the moving catalyst bed reactor where the catalyst is taken out therefrom and is again supplied thereto, and further that the precipitation and adhesion of the salts can be prevented by introducing a sealing gas into the portions of the moving catalyst bed reactor where the catalyst is taken out therefrom and is again supplied thereto.

An object of the present invention is to provide a method for removing nitrogen oxides from exhaust gases containing nitrogen oxides, sulfur oxides and dusts by catalytical reduction thereof without a decrease of the activity of the catalyst.

Another object of the present invention is to provide a method for preventing the decrease of catalyst activity due to the poison thereof by sulfur oxides in a moving catalyst bed type process for the removal of nitrogen oxides.

Other objects and further scope of applicability of the present invention will become apparent from the detailed description given hereinafter; it should be understood, however, that the detailed description and accompanying specific examples, while indicating preferred embodiments of the present invention, are given by way of illustration only, since various changes and modifications within the spirit and scope of the invention will become apparent to those skilled in the art from this detailed description. These changes and modifications are intended to be encompassed within the scope of the invention.

SUMMARY OF THE INVENTION

The present invention provides a method for the removal of nitrogen oxides from heavy oil combustion exhaust gases containing nitrogen oxides, sulfur oxides and dusts by a catalytic reduction process using a moving catalyst bed reactor wherein the exhaust gases are catalytically contacted with ammonia at 250° to 450° C., which is characterized in that a sealing gas having a temperature of 200° C. or higher and a pressure higher than the average pressure at the outlet and inlet of the moving catalyst bed reactor is introduced into the portions of the reactor where the catalyst is taken out therefrom and is again supplied thereto.

According to the method of the present invention, even when a catalyst which is not poisoned by sulfur oxides is used in the moving catalyst bed type process, there is not observed such a decrease of catalyst activity as observed with the conventional methods, and the catalyst taken out from the reactor may be subjected merely to the removement of dusts. When a catalyst which is easily poisoned by sulfur oxides is used, the catalyst taken out from the reactor may be subjected to the removal of dusts and also to the reactivation treatment thereof, whereby the original activity of the catalyst is recovered.

In the method of the present invention, a moving bed reactor is used in order to remove the dusts and/or to reactivate the catalyst poisoned by sulfur oxides. The catalyst is continuously or intermittently taken out from the outlet for taking out the catalyst of the catalytic reduction reactor, and is subjected to the treatments for removing the dusts and/or for reactivation, and then is again supplied or reintroduced into the reactor via the inlet for supplying the catalyst. The moving bed is preferably provided in the manner that the exhaust gas is flowed horizontally and the catalyst bed is provided vertically, and the outlet for taking out the catalyst is provided at the bottom where the exhaust gas is contacted with the catalyst and the inlet for supplying the catalyst is provided at the upper end. The taking out of the catalyst is not necessarily done continuously, but preferably intermittently. The amount of catalyst to be taken out depends on the amount of dusts built up and the degree of decrease of the catalyst activity and a small amount of the catalyst is continuously or intermittently taken out. The taking out and supplement may preferably be done mechanically.

The method of the present invention may be applied to an exhaust gas obtained by burning a heavy oil, which contains usually sulfur oxides of 800 to 1200 ppm, and the catalyst used therein is not necessarily restricted to a specific catalyst which is not poisoned by sulfur oxides, but may be any kind of catalysts which are usually used in a fixed bed type process.

Suitable examples of the catalyst are the catalysts obtained by carrying oxides of vanadium, tungsten, molybdenum or the like on a carrier such as alumina, which are used for treating so-called "dirty gas", i.e. gas containing a large amount of dusts and sulfur oxides, the catalysts obtained by carrying oxides of iron, titanium, vanadium, tin or the like on a carrier such as alumina or titania, or the catalysts obtained by precipitation process, or kneading process without using a carrier.

The sealing gas is introduced into the portions of the moving catalyst bed reactor where the catalyst is taken out therefrom and is again supplied thereto, i.e. around the outlet for taking out the catalyst of the reactor and around the inlet for supplying the catalyst of the reactor. Suitable examples of the sealing gas are inert gases, such as air and nitrogen gas. It is preferable to use a sealing gas containing no sulfur oxides and nitrogen oxides. The sealing gas is introduced in order to prevent the precipitation and adhesion of salts such as ammonium sulfate and ammonium hydrogen sulfate onto the catalyst, and in this case, it is necessary to keep the pressure at the portions of the reactor where the catalyst is taken out therefrom and is again supplied thereto at a pressure higher than that in the reactor. In order to satisfy this condition, the sealing gas is supplied while keeping the pressure thereof at a pressure higher than the average pressure at the outlet and inlet of the reactor. The sealing gas is usually introduced at a temperature of 200° C. or higher, but usually not higher than 800° C.; preferably 280° C. or higher, and more preferably between 280° to 450° C.

The catalyst taken out from the moving bed reactor in the present invention is usually not adhered or contaminated with salts such as ammonium sulfate and ammonium hydrogen sulfate, but is built up with dusts on the surface thereof because the heavy oil combustion exhaust gas usually contains dusts in an amount of several tens mg/Nm$^3$ to several hundreds mg/Nm$^3$. Accordingly, the catalyst taken out from the reactor is subjected to the treatment for removing dusts. Removement of dusts is effectively carried out by washing the catalyst with water or a boiling water, by screening the catalyst and dusts with a shaking screen or with air, or by a combination of these means. Screening with a shaking screen is preferred.

When the catalyst taken out from the reactor is poisoned by sulfur oxides, it is subjected to the treatment for reactivation thereof. Reactivation may be carried out, for instance, by re-calcining at 350° to 800° C. (cf. Japanese patent application No. 103330/1975), by washing with water and then re-calcining at 100° to 500° C. (cf. Japanese patent application No. 5351/1975), or by immersing again in an aqueous solution of the catalyst components (metal oxides) and then re-calcining at 350° to 800° C. (cf. Japanese patent application No. 127169/1975). The method of re-calcining at 350° to 800° C. is preferably applicable to the present invention.

The catalyst subjected to the treatment for removing dusts and/or reactivation thereof is again supplied into the reactor via the inlet for supplying the catalyst.

The catalytic reduction of nitrogen oxides with ammonia in the present invention may be carried out at a temperature of 250° to 450° C., preferably 300° to 350° C. Ammonia is added to the reaction system at the upper side of the catalyst bed in an amount of 0.7 to 2.0 times the equivalent to that of nitrogen oxides to be reduced.

According to the present invention, the catalyst taken out from the outlet for taking out the catalyst of the moving bed reactor is not adhered or contaminated with salts such as ammonium sulfate and ammonium hydrogen sulfate, and hence the catalytic reduction of nitrogen oxides can be efficiently accomplished.

It is not clear why the adhesion of the sulfates onto the catalyst can be prevented by the method of the present invention, but it is assumed that the sulfates are produced from sulfur oxides, steam and ammonia (reducing agent) under a specific condition and this condition for producing the sulfates is satisfied around the outlet for taking out the catalyst and at the inlet for supplying the catalyst of the reactor, and according to the present invention, this condition for producing the sulfates is destroyed or eliminated by introducing the sealing gas having at the specified temperature and pressure and, thereby inhibiting or eliminating the production of the sulfates and preventing the decrease of catalyst activity.

DESCRIPTION OF THE PREFERRED EMBODIMENTS

The present invention is illustrated by the following Example, but is not limited thereto.

EXAMPLE

Using a moving catalyst bed type reactor in a pilot scale which was filled with a catalyst (about 100 liters) produced by carrying vanadium oxide (2.71% by weight) and molybdenum oxide (1.41% by weight) onto α-alumina and calcining at 400° C., the rate of decrease of activity of the catalyst, which was taken out from the reactor and subjected to the treatment for removing dusts and/or for reactivation and then again supplied into the reactor was determined, while varying the kind of the sealing gas to be introduced and the temperature and pressure thereof when introduced.

While passing an exhaust gas (sulfur oxides concentration: about 900 ppm, steam concentration: about 11% by volume), the catalyst was taken out in an amount of about 5 liters once per day by make-and-break mechanism of the discharge plate at the outlet for taking out the catalyst of the reactor and the catalyst taken out was led into a hopper wherein the catalyst was retained for about half a day and then the catalyst was supplied into the reactor.

The removal ratio of nitrogen oxides (NO) was measured under the conditions of space velocity: 10,000 hr$^{-1}$, temperature: 350° C., molar ratio of NO to ammonia: 1.0, and analytical method for NO: meter by chemical luminesence method. The results are shown in the following Table 1.

Table 1

| Experiment No. | Sealing gas Kind | Pressure when introduced (mmAq) | Average pressure*[1] of outlet and inlet of the reactor (mmAq) | Temperature of sealing gas (°C.) | $\Delta\eta_{NO}$*[2] (%) | Remark |
| --- | --- | --- | --- | --- | --- | --- |
| 1 | Air | 450 | 330 | 285 | 0 | |
| 2 | " | " | " | 250 | 2 | |
| 3 | " | " | " | 210 | 3 | |
| 4 | " | " | " | 185 | 22 | Reference Example |
| 5 | Nitrogen gas | 450 | 320 | 290 | 0 | |
| 6 | " | " | " | 230 | 3 | |
| 7 | " | " | " | 190 | 18 | Reference Example |
| 8 | Air | 250 | 326 | 190 | 21 | Reference Example |
| 9 | " | 340 | 326 | 280 | 0 | |
| 10 | Nitrogen gas | 260 | 325 | 185 | 24 | Reference Example |
| 11 | Air | 250 | 330 | 230 | 11 | Reference Example |

*[1]Average pressure of outlet and inlet of the reactor = [(pressure of inlet of the reactor) + (pressure of outlet of the reactor)] × ½
*[2]$\Delta\eta_{NO}$ means the difference of the removal ratio of nitrogen oxides between the value before the catalyst was taken out from the reactor and the value after the catalyst was again supplied into the reactor and is calculated by the following equations:

$$\eta_{NO} = \frac{\left(\begin{array}{c}\text{Concentration of NO (ppm)} \\ \text{at inlet of the reactor}\end{array}\right) - \left(\begin{array}{c}\text{Concentration of NO (ppm)} \\ \text{at outlet of the reactor}\end{array}\right)}{\text{Concentration of NO (ppm) at inlet of the reactor}} \times 100$$

$\Delta\eta_{NO} = (\eta_{NO}$ before the catalyst was taken out$) - (\eta_{NO}$ after the catalyst was again supplied$)$ The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In the method for the removal of nitrogen oxides from heavy oil combustion exhaust gases containing nitrogen oxides, sulfur oxides and dusts by a catalytic reduction process using a moving catalyst bed reactor wherein the exhaust gases are catalytically contacted with ammonia at 250° to 450° C., the improvement comprises introducing a sealing gas having a temperature of 200° C. or higher and a pressure higher than the average pressure at the outlet and inlet of the moving catalyst bed reactor into the portions of the reactor where the catalyst is taken out therefrom and is again supplied thereto.

2. The method according to claim 1, wherein the sealing gas is air.

3. The method according to claim 1, wherein the sealing gas is an inert gas.

4. The method according to claim 1, wherein the sealing gas has a temperature of 280° C. or higher.

5. The method according to claim 1, wherein the sealing gas is introduced at a temperature of between 280° to 450° C.

* * * * *